United States Patent Office 3,459,817
Patented Aug. 5, 1969

3,459,817
1-1-DIFLUORO-2 DIFLUOROMETHYL-2-FLUORO-4-CHLORO-3-BUTYNE
Robert E. A. Dear, Convent Station, and Everett E. Gilbert, Morristown, N.J., assignors to Allied Chemical Corporation, New York, N.Y., a corporation of New York
No Drawing. Filed Feb. 24, 1967, Ser. No. 618,327
Int. Cl. C07c 21/22; A01n 9/30
U.S. Cl. 260—653.3                                            1 Claim

ABSTRACT OF THE DISCLOSURE

The new compound 1,1-difluoro-2-difluoromethyl-2-fluoro-4-chloro-3-butyne, useful as a pesticidal fumigant.

---

This invention relates to the new acetylenic fluorocarbon 1,1-difluoro-2-difluoromethyl-2-fluoro-4-chloro-3-butyne, useful as a pesticidal fumigant.

The acetylenic fluorocarbon of our invention has the following formula

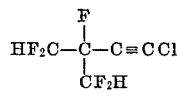

The compound of our invention is prepared by the reaction of sulfur tetrafluoride with 1,1-difluoro-2-difluoromethyl-4-chloro-3-butyne-2-ol according to the equation shown below

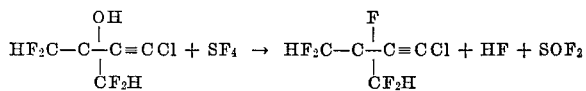

The butyn-ol starting material can be prepared as described in our copending application Ser. No. 550,113 filed May 16, 1966.

The fact that the hydroxyl in the butynol is replaced by fluorine without rearrangement of the acetylenic triple bond, is surprising since we found that in general acetylenic alcohols of similar character including that identical to the one used herein except for a hydrogen substituent on the number 4 carbon rather than chlorine substituent produces the corresponding 2,3-butadiene, as brought out in our copending application Ser. No. 603,735, filed Dec. 22, 1966.

In carrying out the preparation of the new compound according to the process of our invention, a charge of 1,1-difluoro - 2 - difluoromethyl-4-chloro-3-butyne-2-ol is placed in a closed reactor which is then cooled to at least as low as about —38° C. (the boiling point of $SF_4$), preferably to between about —50° C. and —80° C. The reactor is then evacuated, for example, to about 5 to 10 mm. Hg pressure, and sulfur tetrafluoride is fed into the reactor as a gas which condenses in the cold reactor. After the required amount of $SF_4$ has been charged, the reactor is warmed to at least about 0° C., preferably to between about 20° C. and about 30° C. to bring about reaction of $SF_4$ with the alcohol. The reactor is maintained under superatmospheric pressure during the course of the reaction, the spontaneously developed autogenous pressure of the reaction usually being sufficient, for example between about 25 p.s.i.g. and about 75 p.s.i.g. Superatmospheric pressure appears to be essential to the reaction as simply bubbling $SF_4$ gas through a solution of halomethyl-3-butyne-2-ol fails to result in the desired reaction. Reaction is usually complete in a period of between about 2 hours and about 20 hours. Upon completion of the reaction, the product is recovered as by venting the gases, slurrying the liquid reaction product with NaF to remove HF, filtering and distilling. The resulting product is a low boiling liquid.

Fumigation with 1,1,-difluoro - 2 - difluoromethyl-2-fluoro-4-chloro-3-butyne according to our invention is carried out according to conventional fumigation practices, by exposing the organisms to toxic concentrations of vapor of the fluorochloro butyne. Since the fluorochloro butyne is a liquid at normal atmospheric conditions, it can conveniently be furnished in a liquefied state in a tank from which the toxicant will emerge on release of a valve. The toxicant is thus introduced into the space to be fumigated or injected into the body of the material to be treated such as grain, flour or the like, thus subjecting the organisms to be controlled to the vapors of the toxicant for a period sufficient to rid the space of the pests.

The following specific examples further illustrate our invention.

EXAMPLE 1

Preparation of 1,1-difluoro-2-difluoromethyl-2-fluoro-4-chloro-3-butyne

Twenty grams (0.115 mole) of 1,1-difluoro-2-difluoromethyl-4-chloro-3-butyne-2-ol, $(CF_2H)_2C(OH)C \equiv CCl$, were placed in a stainless steel reactor. The reactor was closed, cooled to —78° C. and evacuated. Then 18 grams (0.116 mole) of sulfur tetrafluoride was condensed into the reactor which was then set aside and allowed to stand at ambient temperatures (ca. 20–25° C.) overnight. Pressure reached a maximum of 65 p.s.i.g. At the end of this 16–18 hour period the reactor was vented, the liquid contents were slurried with sodium fluoride to remove hydrogen fluoride, filtered and distilled. There were obtained 16.8 grams of a water-white liquid representing a yield of 83.7% of theory. Its boiling point was 32–34° C. at 63 mm. Hg pressure, its refractive index was $N_D^{25}$ 1.3576. Its infrared spectrogram showed the characteristic absorption peak at $2242^{cm.-1}$ denoting $C \equiv C$, and showed complete absence of any allene, $C=C=C$, absorption which if present would appear at about $2000^{cm.-1}$, and showed complete absence of OH bands. Elemental analysis, and n.m.r. (nuclear magnetic resonance) spectroscopy confirmed its identity as 1,1-difluoro-2-difluoromethyl-2-fluoro-4-chloro-3-butyne.

EXAMPLE 2

Fumigant tests

The 1,1-difluoro-2-difluoromethyl-2-fluoro-4-chloro-3-butyne obtained in Example 1 was tested as a fumigant against the three "stored product insects," confused flour beetle (*Tribolium confusum*) adults, lesser meal worm (*Aliphitobius diaperinus*) adults and black carpet beetle (*Attagenus piceus*) larvae as follows:

For each test 10 insects were placed in 1.5 inch diameter salve tins with perforated lids and an appropriate amount of food was placed into each tin. Then 0.066 gram portions of toxicant (equivalent to about 1 pound of toxicant per 1,000 cubic feet of air), were placed on a Cellucotton wad or in a small open container in a one gallon glass jar. The containers with insects were then introduced into the jars, which were then sealed and allowed to remain for 24 hours' exposure. Similar tests were run using the same insects placed in jars containing no toxicant. The insect containers were then removed and mortality counts were made after 5 days. Results of this test are shown in Table 1 below.

TABLE 1.—FUMIGANT TESTS—STORED PRODUCT INSECTS

| Dosage, pounds per 1,000 cu. ft. | Percent 5-day mortality after 24 hours' exposure | | |
|---|---|---|---|
| | CFB | LMW | BCB |
| 1.0 | 100 | 100 | 100 |
| None | 0 | 0 | 0 |

CFB = Confused Flour Beetle.
LMW = Lesser Meal Worm.
BCB = Black Carpet Beetle.

In similar tests the hydroxy-butyne starting material failed to effect appreciable kill of any of the above organisms.

While the above describes the preferred embodiments of our invention, it will be understood that departures can be made therefrom within the scope of the specification and claim.

We claim:
1. The acetylenic fluorocarbon of the formula

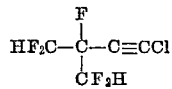

References Cited

UNITED STATES PATENTS 2,546,997  4/1951  Gochenour _____ 260—653.3
2,980,740  4/1961  Hasek et al. _____ 260—653

DANIEL D. HORWITZ, Primary Examiner

U.S. Cl. X.R.
424—351